United States Patent [19]

Kitta

[11] Patent Number: 5,754,781
[45] Date of Patent: May 19, 1998

[54] DATA TRANSFER CONTROLLER DEVICE FOR CONTROLLING DATA TRANSFERRED BY AND AMONG SEPARATE CLUSTERS

[75] Inventor: Michio Kitta, Yamanashi, Japan

[73] Assignee: NEC Corporation, Tokyo, Japan

[21] Appl. No.: 621,142

[22] Filed: Mar. 21, 1996

[30] Foreign Application Priority Data

Mar. 22, 1995 [JP] Japan .................. 7-062853

[51] Int. Cl.$^6$ .................. G06F 13/14
[52] U.S. Cl. .................. 395/200.43; 395/800.01; 395/200.3; 395/200.32; 395/200.33; 395/200.44; 395/200.45; 364/DIG. 1
[58] Field of Search .................. 395/200.01, 200.02, 395/200.03, 200.04, 800.01, 200.3, 200.32, 200.33, 200.45, 200.44, 200.43; 364/DIG. 1

[56] References Cited

U.S. PATENT DOCUMENTS 4,888,726  12/1989  Struger et al. .................. 364/900
5,142,683  8/1992  Burkhardt, Jr. et al. .................. 395/725
5,197,130  3/1993  Chen et al. .................. 395/325
5,212,773  5/1993  Hillis .................. 395/200
5,386,566  1/1995  Hamanaka et al. .................. 395/700

Primary Examiner—Daniel H. Pan
Assistant Examiner—Dzung C. Nguyen
Attorney, Agent, or Firm—Sughrue, Mion, Zinn, Macpeak & Seas, PLLC

[57] ABSTRACT

A data transfer control device comprises an instruction storage units and for storing a data transfer instruction, an instruction decoding unit for reading the data transfer instruction from the instruction storage units and to decode the content thereof, a shared memory access unit for reading and writing the data through access to a shared memory in the same cluster, a data transfer unit for sending the data to a network among clusters and receiving the data from the network among clusters and a transfer control unit for controlling the shared memory access unit and the data transfer unit according to the data transfer instruction decoded by the instruction decoding unit, as well as for storing the data transfer instruction issued from another cluster into a second instruction storage unit when the data transfer unit receives the data transfer instruction from another cluster through the network among clusters.

11 Claims, 4 Drawing Sheets

DATA TRANSFER CONTROLLER DEVICE FOR CONTROLLING DATA TRANSFERRED BY AND AMONG SEPARATE CLUSTERS

BACKGROUNDS OF THE INVENTION

1. Field of the Invention

The present invention relates to a data control device for controlling data transfer between clusters connected through a network among clusters, and more particularly to a data transfer control device for controlling data transfer on the basis of transfer instructions issued from one cluster as well as another cluster.

2. Description of the Related Art

In an information processing system having a plurality of clusters connected through a network among clusters, data transfer is controlled by a data transfer control device provided in each cluster in order to transfer data between clusters.

FIG. 5 shows an example of an organization of a conventional data transfer control device.

As illustrated in FIG. 5, this kind of a conventional data transfer control device 150 comprises an instruction storage unit 151 for storing a data transfer instruction delivered by an arithmetic processing unit 20 in the same cluster 110, an instruction decoding unit 153 for reading the transfer instruction from the instruction storage unit 151 to decode the instruction, a shared memory access unit 155 for reading and writing the data through access to a shared memory 30 in the same cluster 110, a data transfer unit 156 for delivering the data to a network 60 among clusters, and a transfer control unit 154 for controlling the shared memory access unit 155 and the data transfer unit 156 according to the transfer instruction decoded by the instruction decoding unit 153. Each cluster has the same organization.

In thus-constituted data transfer control unit 150, data transfer control includes a process of reading the data from a shared memory 30 in the same cluster 110 and writing the data into a shared memory 30 in another cluster 110 and a process of reading the data from a shared memory in another cluster 110 and also writing the data into a shared memory 30 in the same cluster 110. An operation of the data transfer control is performed as follows.

At first, when the data transfer control unit 150 receives a data transfer instruction issued by the arithmetic processing unit 20 in the same cluster 110, the instruction storage unit 151 stores the data transfer instruction. The data transfer instruction is thus delivered from the arithmetic processing unit 20 to the instruction storage unit inside the same cluster. The instruction decoding unit 153 reads out the transfer instruction from the instruction storage unit 151 to decode the instruction.

The transfer control unit 154 controls each unit according to the transfer instruction decoded by the instruction decoding unit 153. For example, when the transfer instruction is to transfer data from the shared memory 30 in the same cluster 110 to a shared memory 30 in another cluster 110, the transfer control unit 154 receives information such as a reading starting address in the cluster from which the data is sent, the size of the transfer data, a writing starting address for the cluster to which the data is sent, gives an instruction to the shared memory access unit 155 so as to read the data for every unit of data transfer process from the shared memory 30.

The shared memory access unit 155 sends to the data transfer unit 156 the data which has been read out from the shared memory 30 according to the instruction of the transfer control unit 154, and notifies the transfer control unit 154 of the readout being completed.

Next, the transfer control unit 154 gives an instruction to the data transfer unit 156 so as to send the data which has been delivered from the shared memory access unit 155 to the data transfer unit 156, to the network among clusters. At this time, additional information including a cluster identifier, a writing address for the destination cluster of the transfer data, the size of the transfer data, an operational instruction to a data transfer control unit in the destination cluster, and the like is added to the transfer data.

According to the instruction of the transfer control unit 154, the data transfer unit 156 sends the data delivered from the shared memory access unit 155 and the additional information added by the transfer control unit 154 to the network 60 among clusters. The data delivered from the data transfer unit 156 is transferred through the network 60 among clusters to the data transfer control unit 150 in the destination cluster indicated by the cluster identifier of the additional information.

In the data transfer control unit 150 of the destination cluster 110, when the data transfer unit 156 accepts the received data, the additional information is separated from the received data to be sent to the transfer control unit 154. The transfer control unit 154 gives an instruction to the data transfer unit 156 and the shared memory access unit 155 so as to write the data within the data transfer unit 156 into the shared memory 30 in the same cluster 110 on the basis of the additional information. According to this instruction, the data transfer unit 156 reads out the write data and sends it to the shared memory access unit 155. The shared memory access unit 155 writes the write data delivered from the data transfer unit 156 into the shared memory 30 according to the instruction of the transfer control unit 154.

When the transfer instruction is issued to transfer the data from a shared memory 30 in another cluster 110 to the shared memory 30 in the present cluster to the operation mentioned above, the transfer control unit 154 acquires the information such as a reading starting address in another cluster from which the data is read out, the size of the transfer data, a writing starting address for the present cluster, and the like, from the transfer instruction decoded by the instruction decoding unit 153. The transfer control unit 154 also transmits the information such as an identifier of another cluster, address of the required transfer data in another cluster, the size of the transfer data, an operational instruction to a data transfer control unit in another cluster, and the like, to another cluster 110 through the data transfer unit 156 and the network 60 among clusters.

As mentioned above, the conventional data transfer control device can execute the transfer control of reading the data from the shared memory in the present cluster and writing the data into a shared memory in another cluster, as well as the transfer control of reading the data from a shared memory in another cluster and writing the data into the shared memory in the present cluster. More specifically, when executing the data transfer from a cluster (A) to a cluster (B), it can transfer the data in the following two cases; the arithmetic processing unit of the cluster (A) issues the transfer instruction for transferring the data from the cluster (A) to the cluster (B) and the data transfer control device of the cluster (A) executes the transfer control so as to deliver the data, and the arithmetic processing unit of the cluster (B) issues the transfer instruction for transferring the data from the cluster (A) to the cluster (B) and the data transfer control device of the cluster (B) executes the transfer control so as to obtain the data.

However, the above mentioned conventional data transfer control unit can't execute the data transfer from a cluster (A) to a cluster (B) by a third cluster (C) according to the transfer instruction issued from the third cluster (C). Under the information processing system performing concentrated control with several clusters fixed as front end clusters and the others fixed as back end clusters, when managing the data transfer between shared memories in all the clusters of the information processing system by the use of the front end clusters, it has a defect that the data transfer between shared memories can't be performed in the back end clusters.

Further, under this system, data may be once transferred to a front end cluster from a back end cluster from which the data is sent, and then transferred therefrom to a back end cluster to which the data is sent. This case requires transfer procedure two times because of making the front end cluster intervening therebetween, thereby deteriorating the processing performance in the system.

SUMMARY OF THE INVENTION

In order to solve the above mentioned problems, the first object of the present invention is to provide a data transfer control device enabling data transfer between clusters on the basis of the transfer instruction issued from the third cluster other than the data destination cluster and the data source cluster.

In addition to the above, the second object of the present invention is to provide a data transfer control device enabling data transfer between back end clusters under an information processing system performing concentrated control with several clusters fixed as front end clusters and the others fixed as back end clusters.

According to the first aspect of the invention, a data transfer control device respectively provided in a plurality of clusters connected through a network among clusters for controlling data transfer between shared memories in the respective clusters, comprising:

an instruction storage means for storing a data transfer instruction issued by an arithmetic processing unit provided in the cluster;

an instruction decoding means for reading out the data transfer instruction from said instruction storage means to decode the content thereof;

a shared memory access means for reading and writing the data through access to said shared memory in the present cluster;

a data transfer means for sending the data to said network among clusters and receiving the data from said network among clusters; and a transfer control means for controlling said shared memory access means and said data transfer means according to the data transfer instruction decoded by said instruction decoding means and storing the data transfer instruction issued from another cluster into said instruction storage means when said data transfer means receives the data transfer instruction through said network among clusters from another cluster.

In the preferred construction, the instruction storage means comprises a first instruction storage means for storing a data transfer instruction obtained through a local network connecting said arithmetic processing units and said shared memory provided in the present cluster, and a second instruction storage means for storing a data transfer instruction received through said network among clusters by said transfer control means.

In the preferred construction, the transfer control means notifies the data transfer instruction source cluster of the data transfer being completed when executing the data transfer on the basis of the data transfer instruction received through said network among clusters, stored into said instruction storage means, and decoded by said instruction decoding means.

In another preferred construction, when the data transfer instruction decoded by said instruction decoding means is of the type to transfer the data from another cluster to yet another cluster, said transfer control means transfers the data transfer instruction through said network among clusters to the data source cluster or the data destination cluster indicated by the data transfer instruction.

According to the second aspect of the invention, a data transfer control device respectively provided in a plurality of clusters connected through a network among clusters for controlling data transfer between shared memories in the respective clusters, comprising:

a first instruction storage means for storing a data transfer instruction issued by an arithmetic processing unit provided in the present cluster;

a second instruction storage means for storing a data transfer instruction issued by an arithmetic processing unit provided in another cluster and received through said network among clusters;

an instruction decoding means for reading out the data transfer instruction from said first or second instruction storage means to decode the content thereof;

a shared memory access means for reading and writing the data through access to said shared memory in the present cluster;

a data transfer means for sending the data to said network among clusters and receiving the data from said network among clusters; and a transfer control means for controlling said shared memory access means and said data transfer means according to the data transfer instruction decoded by said instruction decoding means, and storing the data transfer instruction issued from another cluster into said second instruction storage means when said data transfer means receives the data transfer instruction through said network among clusters from another cluster.

According to the third aspect of the invention, a data transfer control device provided in an information processing system having a plurality of front end clusters and back end clusters connected through a network among clusters and concentrically controlling the data transfer between shared memories of the clusters by the use of said front end clusters, wherein, the data transfer control device provided in said front end cluster comprises:

an instruction storage means for storing a data transfer instruction issued by an arithmetic processing unit provided in the cluster;

an instruction decoding means for reading out the data transfer instruction from said instruction storage means to decode the content thereof;

a shared memory access means for reading and writing the data through access to said shared memory in the present cluster;

a data transfer means for sending the data to said network among clusters and receiving the data from said network among clusters; and a transfer control means for controlling said shared memory access means and said data transfer means according to the data transfer instruction decoded by said instruction decoding means and for transferring the data transfer instruction through said network among clusters to the data source cluster or the data destination cluster indicated by the data transfer instruction when the data transfer instruction decoded by said instruction decoding means is of the type to transfer the data from another cluster to further another cluster than the present cluster;

while, the data transfer control device provided in said back end cluster comprises:

an instruction storage means for storing a data transfer instruction issued by an arithmetic processing unit provided in the cluster;

an instruction decoding means for reading out the data transfer instruction from said instruction storage means to decode the content thereof;

a shared memory access means for reading and writing the data through access to said shared memory in the present cluster;

a data transfer means for sending the data to said network among clusters and receiving the data from said network among clusters; and a transfer control means for controlling said shared memory access means and said data transfer means according to the data transfer instruction decoded by said instruction decoding means, and storing the data transfer instruction issued from another cluster into said instruction storage means when said data transfer means receives the data transfer instruction through said network among clusters from another cluster.

In this case, the transfer control means in said data transfer control device provided in said back end cluster notifies said front end cluster of the data transfer being completed when executing the data transfer on the basis of the data transfer instruction received through said network among clusters, stored into said instruction storage means, and decoded by said instruction decoding means.

According to a further aspect of the invention, a data transfer control device provided in an information processing system having a plurality of front end clusters and back end clusters connected through a network among clusters and concentrically controlling the data transfer between shared memories of clusters by the use of said front end clusters, wherein, the data transfer control device provided in said front end cluster comprises:

an instruction storage means for storing a data transfer instruction issued by an arithmetic processing unit provided in the cluster, an instruction decoding means for reading out the data transfer instruction from said instruction storage means to decode the content thereof, a shared memory access means for reading and writing the data through access to said shared memory in the present cluster, a data transfer means for sending the data to said network among clusters and receiving the data from said network among clusters, and a transfer control means for controlling said shared memory access means and said data transfer means according to the data transfer instruction decoded by said instruction decoding means and for transferring the data transfer instruction through said network among clusters to the data source cluster or the data destination cluster indicated by the data transfer instruction when the data transfer instruction decoded by said instruction decoding means is of the type to transfer the data from another cluster to further another cluster than the present cluster, while, the data transfer control device provided in said back end cluster comprises:

a first instruction storage means for storing a data transfer instruction issued by an arithmetic processing unit provided in the present cluster, a second instruction storage means for storing a data transfer instruction issued by an arithmetic processing unit provided in another cluster and received through said network among clusters, an instruction decoding means for reading out the data transfer instruction from said first or second instruction storage means to decode the content thereof, a shared memory access means for reading and writing the data through access to said shared memory in the present cluster, a data transfer means for sending the data to said network among clusters and receiving the data from said network among clusters, and a transfer control means for controlling said shared memory access means and said data transfer means according to the data transfer instruction decoded by said instruction decoding means, and storing the data transfer instruction issued from another cluster into said second instruction storage means when said data transfer means receives the data transfer instruction through said network among clusters from another cluster.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to limit the invention, but are for explanation and understanding only.

In the drawings.

DESCRIPTION OF THE PREFERRED EMBODIMENT

The preferred embodiment of the present invention will be explained referring to the accompanying drawings.

Figure 1:
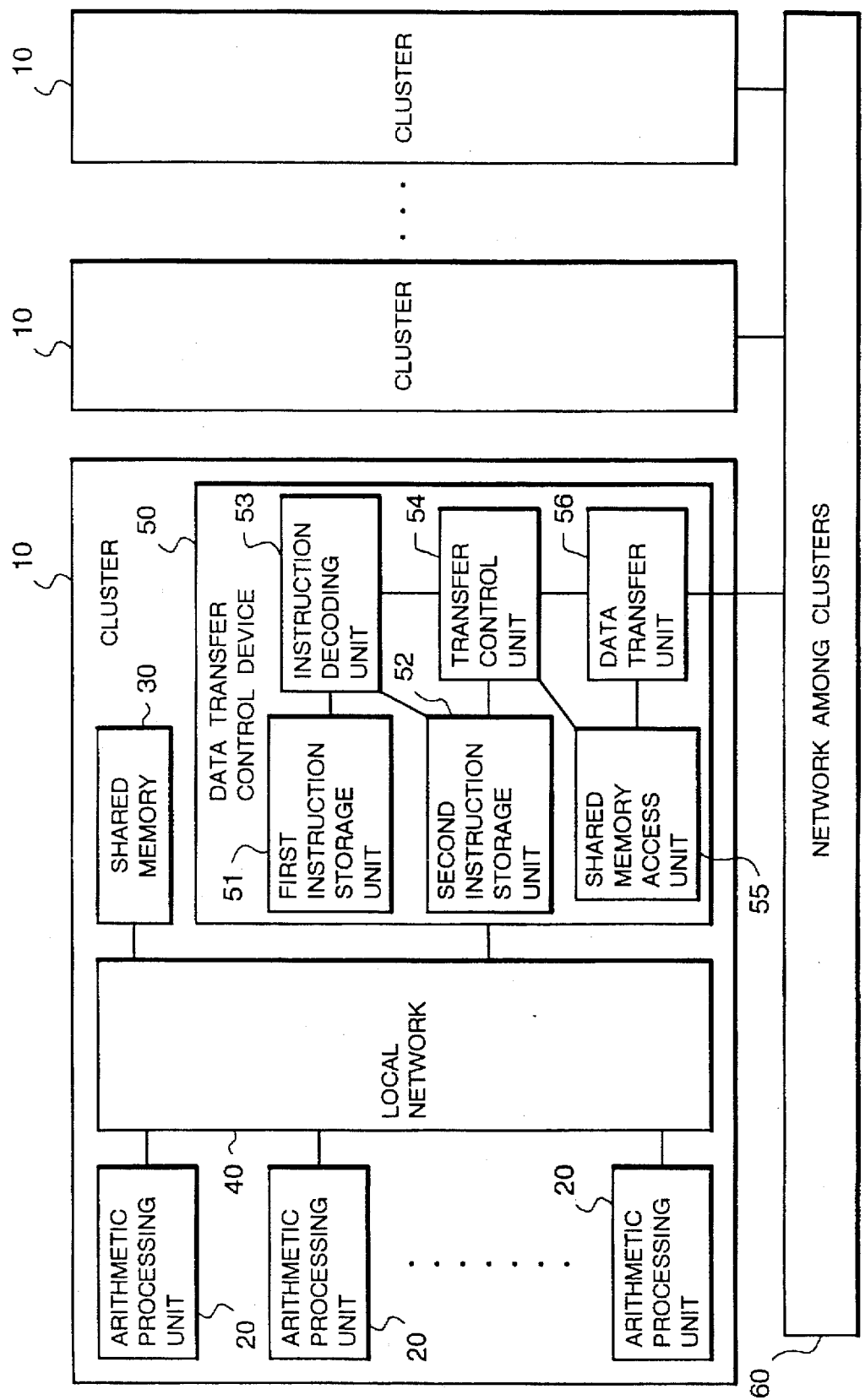
FIG. 1 is a block diagram showing an organization of an information processing system with a data transfer control device according to the first embodiment of the present invention mounted thereon.

FIG. 1 is a block diagram showing an organization of an information processing system with a data transfer control device according to one embodiment of the present invention mounted thereon.

As illustrated, the information processing system used in this embodiment is comprised of several clusters 10 connected through a network 60 among clusters. Each cluster 10 comprises a plurality of arithmetic processing units 20, a shared memory 30 shared by the arithmetic processing units 20, a local network 40 connecting the arithmetic processing units 20 and the shared memory 30, and a data transfer control device 50 provided between the local network 40 and the network 60 among clusters so as to control the data transfer between the shared memories 30 in several clusters 10. The figure shows only a particular organization, while omitting the other organization. Every cluster has the same organization, so that the figure explains only an organization of a cluster, omitting the explanation of the others.

The data transfer control device 50 of this embodiment comprises, as illustrated in FIG. 1, a first instruction storage unit 51 and a second instruction storage unit 52 for storing a data transfer instruction issued by the arithmetic processing units 20, an instruction decoding unit 53 for reading out the transfer instruction from the instruction storage units 51 and 52 to decode the instruction, a shared memory access unit 55 for reading and writing the data through access to the shared memory 30 in the present cluster 10, a data transfer unit 56 for delivering the data to the network 60 among clusters, and a transfer control unit 54 for controlling the shared memory access unit 55 and the data transfer unit 56 according to the transfer instruction decoded by the instruction decoding unit 53.

The first instruction storage unit 51 is realized by a memory such as RAM, for entering and storing a transfer instruction issued by the arithmetic processing unit 20 from the present cluster. The second storage unit 52 is realized by a memory such as RAM, for entering and storing a transfer instruction delivered from another cluster 10 than the present cluster 10. In the case where the first instruction storage unit 51 and the second instruction storage unit 52 are not mentioned distinctively, hereinafter, they are referred to as instruction storage units 51 and 52. These instruction storage units 51 and 52 have the same function. However, they enter a transfer instruction in a different path; the first instruction storage unit 51 enters a transfer instruction from the arithmetic processing unit 20 of the present cluster through the local network 40, while the second instruction storage unit 52 enters a transfer instruction through the network 60 among clusters. Therefore, two storage units are provided separately.

The instruction decoding unit 53 is realized by a CPU controlled by program, to read out the transfer instruction stored in the instruction storage units 51 and 52 to decode the content thereof. As a result, the size of the transfer data to be transferred by the transfer instruction, a source cluster 10 of the data and a destination cluster 10 of the data will be specified. When the transfer instruction is read out from the first instruction storage unit 51, the present cluster 10 corresponds to either the source cluster or the destination cluster. When the transfer instruction is read out from the second instruction storage unit 52, the present cluster is neither the source cluster or the destination cluster.

The transfer control unit 54 controls the shared memory access unit 55 and the data transfer unit 56 according to the transfer instruction decoded by the instruction decoding unit 53. A transfer instruction is classified into three types of data transfer; from the present cluster 10 to another cluster 10, from another cluster 10 to the present cluster 10, and from another cluster 10 to yet another cluster 10. Control by the transfer control unit 54 varies depending on the type of the transfer instruction as mentioned above. The control by the transfer control unit 54 will be described in detail as follows.

The shared memory access unit 55 is realized by a CPU controlled by program. The unit 55, similarly to the shared memory access unit in the conventional data transfer control device, reads out a desired data from the shared memory to send the data to the data transfer unit 56, notifies the transfer control unit 54 of the data being obtained, or writes the data received from the data transfer unit 54 into the shared memory 30 according to the instruction of the transfer control unit 54.

The data transfer unit 56 is realized by a CPU controlled by program. Similarly to the data transfer unit in the conventional data transfer unit, the data transfer unit 56 delivers the data received from the shared memory access unit 55 to the network 60 among clusters, or sends the data received through the network 60 among the clusters to the shared memory access unit 55, and notifies the transfer control unit 54 of the data being received, according to the instruction of the transfer control unit 54.

Figure 2:
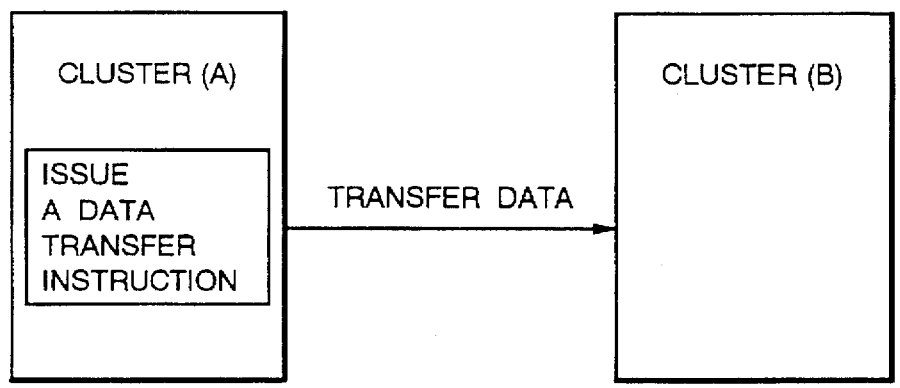
FIG. 2 is a block diagram for explaining data transfer according to this embodiment, showing the case of the data transfer from the present cluster to another cluster by the transfer instruction issued from the present cluster.
Figure 4:
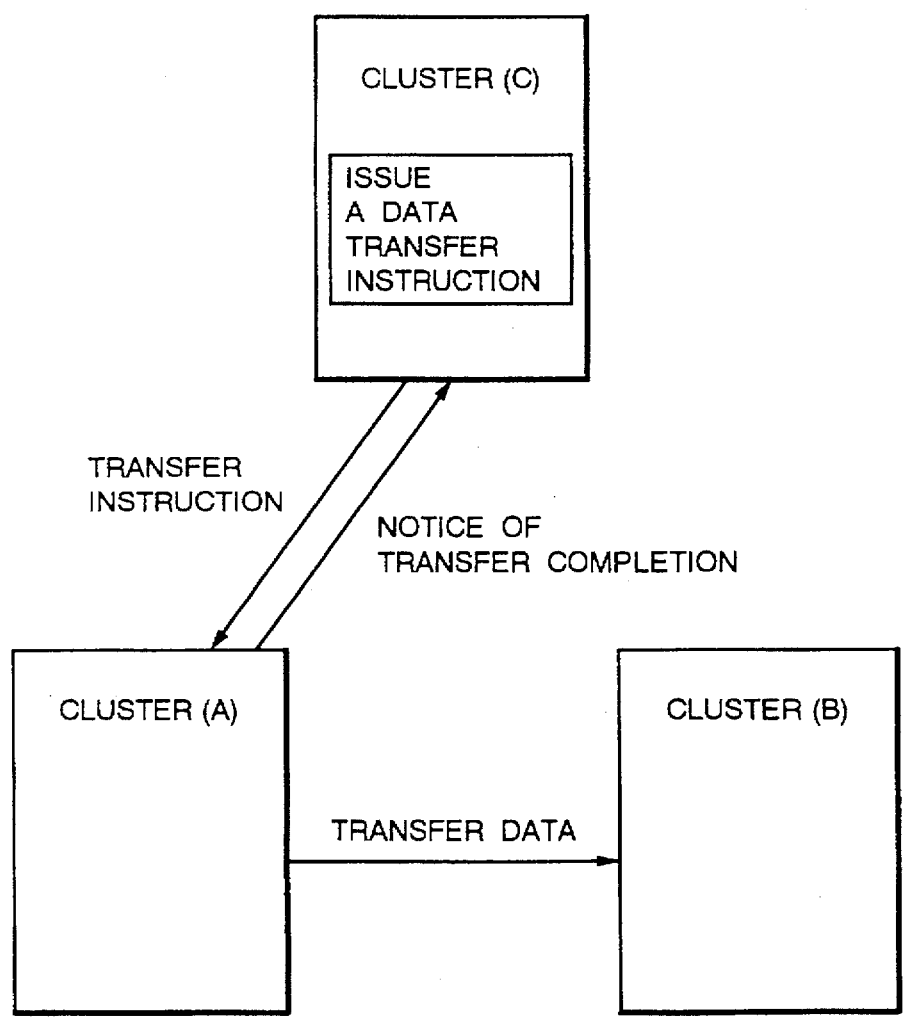
FIG. 4 is a block diagram for explaining data transfer according to this embodiment, showing the case of the data transfer from another cluster to further another cluster than the present cluster by the transfer instruction issued from the present cluster.
Figure 5:
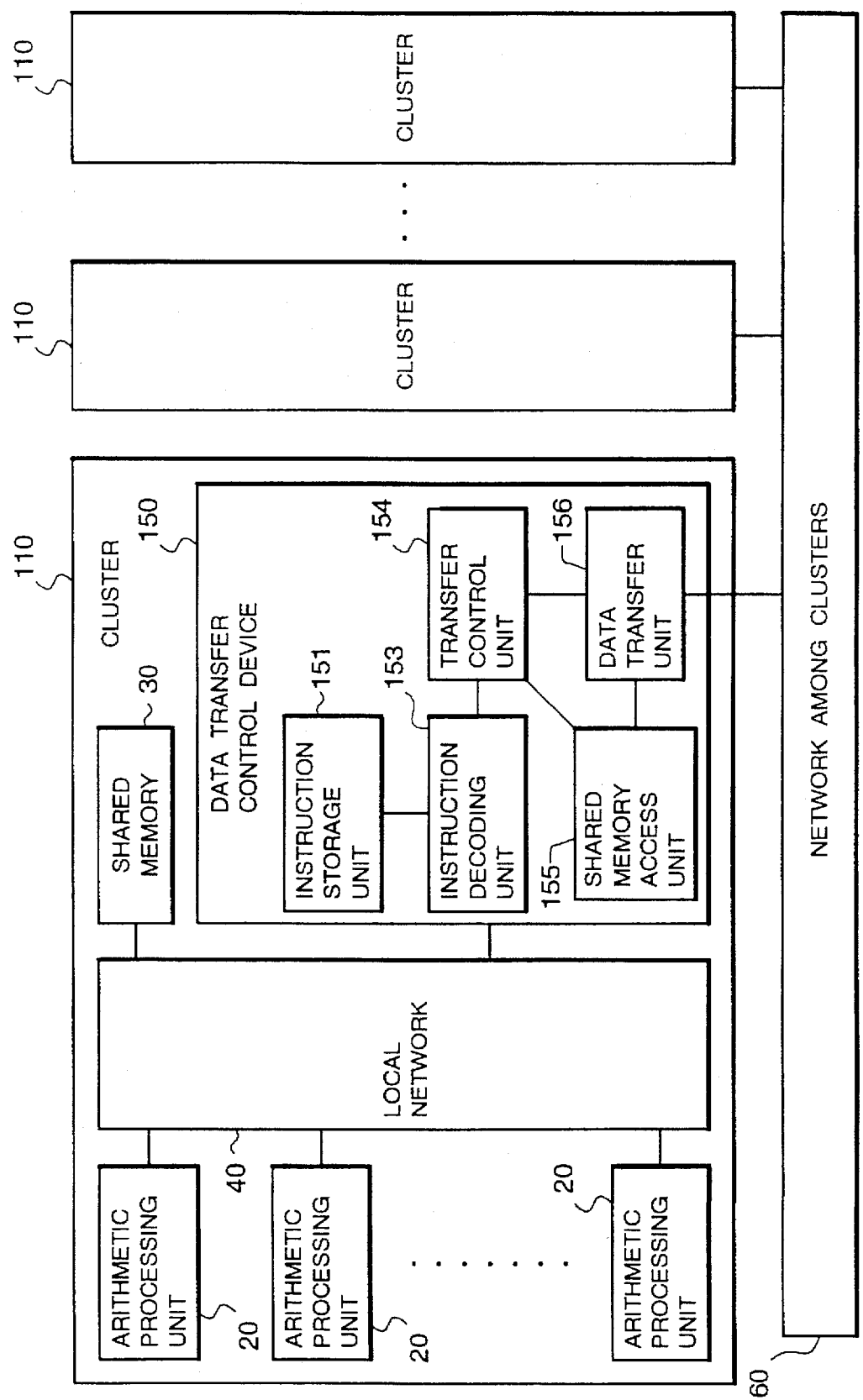
FIG. 5 is a block diagram showing an organization of an information processing system with the conventional data transfer control device mounted thereon.

Hereinafter, an operation according to this embodiment will be explained in every type of transfer instruction. FIGS. 2 and 4 are block diagrams for explaining the case of the data transfer by the use of this embodiment. Hereafter, each component in a cluster (A) of FIGS. 2 and 4 is described with a letter A attached thereto, each component in a cluster (B) is described with a letter B attached thereto, and each component in a cluster (C) is described with a letter C attached thereto. For example, the data transfer control device in the cluster (A) is indicated as the data transfer control device 50A.

As a first case, assume that a transfer instruction for transferring data from the cluster (A) to the cluster (B) is issued by the arithmetic processing unit 20A in the cluster (A). The transfer instruction is of the type to transfer data from the present cluster 10 to another cluster 10. In this case, the transfer instruction issued by the arithmetic processing unit 20A is stored into the first instruction storage unit 51A in the data transfer control device 50A. The instruction decoding unit 53A reads out the transfer instruction from the first instruction storage unit 51A to decode the content thereof.

The transfer control unit 54A, similarly to the transfer control unit in the conventional data transfer control device, receives the information such as a reading starting address in the present cluster (A), the size of the transfer data, a writing starting address for the destination cluster (B), and the like, from the instruction decoding unit 53A, and gives an instruction to the shared memory access unit 55A so as to read out the data for every unit of data transfer process from the shared memory 30A.

The shared memory access unit 55A sends the data read out from the shared memory 30A according to the instruction of the transfer control unit 54A, and notifies the transfer control unit 54A of reading the data being completed.

Next, the transfer control unit 54A gives an instruction to the data transfer unit 56A so as to deliver to the network 60 among clusters the data delivered from the shared memory access unit 55A to the data transfer unit 56A. At this time, additional information such as a cluster identifier, a writing address for the shared memory 30B in the destination cluster (B), the size of the transfer data, an operational instruction for the data transfer control device 50B in the destination cluster (B), and the like, is added to the transfer data.

The data transfer unit 56A delivers the data received from the shared memory access unit 55A and the additional information added by the transfer control unit 54A to the network 60 among clusters according to the instruction of the transfer control unit 54A. The data delivered from the data transfer unit 56A is transferred to the data transfer control device 50B in the destination cluster (B) indicated by the cluster identifier of the additional information through the network 60 among clusters.

In the data transfer control device 50B of the destination cluster (B), when the data transfer unit 56B accepts the received data, the additional information is separated from the received data to be sent to the transfer control unit 54B. The transfer control unit 54B gives an instruction to the data transfer unit 56B and the shared memory access unit 55B so as to write the data within the data transfer unit 56B into the shared memory 30B of the same cluster (B) on the basis of this additional information. According to this instruction, the data transfer unit 56B reads out the write data and sends it to the shared memory access unit 55B. The shared memory access unit 55B writes the write data delivered from the data transfer unit 56B into the shared memory 30B according to the instruction of the transfer control unit 54B.

Figure 3:
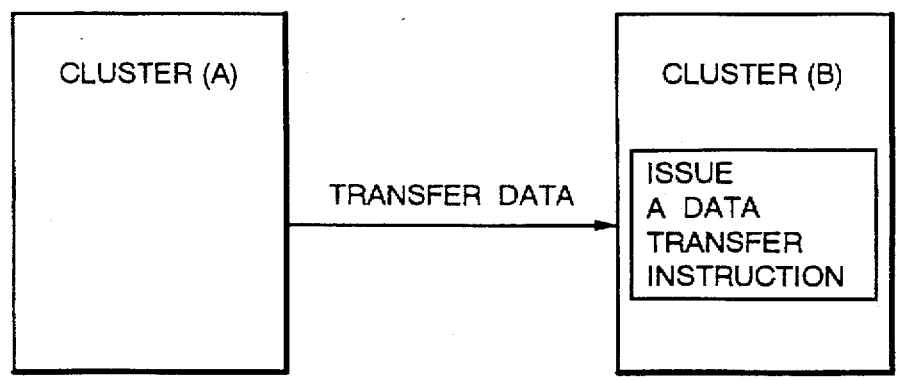
FIG. 3 is a block diagram for explaining data transfer according to this embodiment, showing the case of the data transfer from another cluster to the present cluster by the transfer instruction issued from the present cluster.

As a second case, assume that a transfer instruction for transferring data from a cluster (A) to a cluster (B) is issued by the arithmetic processing unit 20B from the cluster (B) as illustrated in FIG. 3. The transfer instruction is of the type to transfer the data from another cluster 10 to the present cluster 10. In this case, the transfer instruction issued by the arithmetic processing unit 20B is stored into the first instruction storage unit 51B of the data transfer control device 50B. The instruction decoding unit 53B reads out the transfer instruction from the first instruction storage unit 51B to decode the content thereof.

The transfer control unit 54B, similarly to the transfer control unit in the conventional data transfer control device, obtains the information such as a reading starting address for a cluster (A) from which the data is read out by the instruction decoding unit 53B, the size of the transfer data, a writing starting address for the cluster (B), and the like. Then, the transfer control unit 54B delivers the transfer control information such as an identifier of the cluster (A), address in the cluster (A) from which the transfer data is to be delivered, the size of the transfer data, an operational instruction for the data transfer control device 50A in the cluster (A), and the like, to the data transfer unit 56B, and gives an instruction to the data transfer unit 56B so as to deliver such information to the network 60 among clusters.

According to the control of the transfer control unit 54B, the data transfer unit 56B sends the transfer control information to the network 60 among clusters. The transfer control information delivered from the data transfer unit 56B is transferred to the data transfer control device 50A in the cluster (A) from which the data is read out that is indicated by the identifier of the transfer control information.

In the data transfer control device 50A of the cluster (A), when the data transfer unit 56A receives the transfer control information, it sends the transfer control information to the transfer control unit 54A. Based on this transfer control information, the transfer control unit 54A gives an instruction to the shared memory access unit 55A so as to read out the objective data from the shared memory. According to the instruction of the transfer control 54A, the shared memory access unit 55A reads out the objective data from the shared memory 30A to send it to the data transfer unit 56A, and notifies the transfer control unit 54A of reading the data being completed.

The transfer control unit 54A gives an instruction to the data transfer unit 56A so as to send to the network among clusters the data delivered from the shared memory access unit 55A to the data transfer unit 56A. At this time, a cluster identifier is at least added to the transfer data.

According to the instruction of the transfer control unit 54A, the data transfer unit 56A sends to the network 60 among clusters the data delivered from the shared memory access unit 55A. The data delivered from the data transfer unit 56A is transferred to the data transfer control device 50B in the destination cluster (B) indicated by the cluster identifier added to the data.

In the data transfer control device 50B of the cluster (B), when the data transfer unit 56B accepts the received data, the transfer control unit 54B gives an instruction to the data transfer unit 56B and the shared memory access unit 55B so as to write the data within the data transfer unit 56B into the shared memory 30B in the cluster (B). According to this instruction, the data transfer unit 56B reads out the write data and sends it to the shared memory access unit 55B. The shared memory access unit 55B, according to the instruction of the transfer control unit 54B, writes the write data delivered from the data transfer unit 56B into the shared memory 30B.

As a third case, assume that a transfer instruction for transferring data from a cluster (A) to a cluster (B) is issued by the arithmetic processing unit 20C from the third cluster (C). The transfer instruction is of the type to transfer data from another cluster 10 to yet another cluster 10. In this case, the transfer instruction issued by the arithmetic processing unit 20C is stored into the first instruction storage unit 51C of the data transfer control device 50C first. The instruction decoding unit 53C reads out the transfer instruction from the first instruction storage unit 51C to decode the content thereof.

Since the transfer instruction is proved to be of the type to transfer data between clusters other than the present cluster (from the cluster (A) to the cluster (B) in this case), resulted from decoding by the instruction decoding unit 53C, the transfer control unit 54C sends the transfer instruction to the data transfer unit 56C and delivers it to the network 60 among clusters. The transfer instruction is transferred to the data transfer control device 50A in the cluster (A) from which the data is sent on the basis of the cluster identifier of the transfer instruction.

In the data transfer control device 50A of the cluster (A), the data transfer unit 56A accepts the transfer instruction and sends it to the transfer control unit 54A. The transfer control unit 54A stores the received transfer instruction into the second instruction storage unit 52A. The instruction decoding unit 53A reads out the transfer instruction from the second instruction storage unit 52A to decode the content thereof.

Hereafter, the transfer control unit 54A reads out the data from the shared memory 30A and transfers the data to the cluster (B) similarly to the above mentioned first case. More specifically, the transfer control unit 54A receives the information such as a reading starting address in the cluster (A), the size of the transfer data, a writing starting address for the destination cluster (B), and the like, and gives an instruction to the shared memory access unit 55A so as to read out the data for every unit of data transfer process from the shared memory 30A.

Receiving the notice of the completion of reading the data from the shared memory access unit 55A, the transfer control unit 54A gives an instruction to the data transfer unit 56A so as to send to the network 60 among clusters the data delivered from the shared memory access unit 55A to the data transfer unit 56A together with the additional information.

After the data transfer unit 56A sends the data and the additional information to the network 60 among clusters, the transfer control unit 54A transmits the notice of the data transfer being completed, to the cluster (C) from which the transfer instruction is issued, through the data transfer unit 56A and the network 60 among clusters.

In the data transfer control unit 50C of the cluster (C), the data transfer unit 56C receives the notice of the data transfer being completed and sends it to the transfer control unit 54C. The transfer control unit 54C confirms by this notice that the data transfer has been executed.

The data transfer control device 50B in the destination cluster (B), similarly to the above mentioned first case, writes the received data into the specified address in the shared memory 30B according to the control of the transfer control unit 54B.

As a modification example to the third case, a transfer instruction can be delivered from the cluster (C) to the cluster (B) to which the data is to be sent. In this case, the transfer instruction is delivered from the data transfer control device 50C of the cluster (C) to the data transfer control device 50B of the cluster (B) in the same sequence as the third case mentioned above. The instruction for reading the data is sent from the data transfer control device 50B of the cluster (B) to the data transfer control device 50A of the cluster (A) in the same sequence as the above mentioned second case, thereby to execute the data transfer from the cluster (A) to the cluster (B).

As set forth, in the data transfer control device according to the present invention comprising a second instruction storage unit for storing a transfer instruction issued from another cluster, the transfer control unit stores the transfer instruction obtained through the network among clusters into the above second instruction storage unit, and processes the transfer instruction stored in the second instruction storage unit in the same way as the transfer instruction issued by the arithmetic processing unit from the present cluster, thereby to execute the data transfer between clusters on the basis of the transfer instruction issued from the third cluster other than the data destination cluster and the data source cluster.

Under an information processing system concentrically controlling the data with several clusters fixed as front end clusters and all the others fixed as back end clusters, the data transfer between back end clusters is directly enabled owing to this, thereby to prevent the load in the back end clusters from increasing and also prevent the deterioration in the processing performance of the system.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A data transfer control device provided in each of a plurality of clusters connected through an area network, for controlling data transfer between local shared memories of each cluster, comprising:

an instruction storage means for storing a data transfer instruction issued by an arithmetic processing unit, wherein said arithmetic processing unit is provided in any one of said plurality of clusters;

an instruction decoding means for reading out the data transfer instruction from said instruction storage means to decode the proper action required by said transfer instruction;

a shared memory access means for reading and writing data to said shared memory, wherein said shared memory access means and said shared memory are contained within the same cluster;

a data transfer means for sending data to said area network and receiving data from said area network; and a transfer control means for controlling said shared memory access means and said data transfer means according to the data transfer instruction decoded by said instruction decoding means and storing the data transfer instruction issued by another cluster into said instruction storage means when said data transfer means receives said data transfer instruction from said area network.

2. A data transfer control device as set forth in claim 1, wherein said instruction storage means comprises a first instruction storage means for storing a data transfer instruction obtained through a local network connecting said arithmetic processing units and said shared memory provided in the present cluster, and a second instruction storage means for storing a data transfer instruction received through said network among clusters by said transfer control means.

3. A data transfer control device as set forth in claim 1, wherein said transfer control means notifies the data transfer instruction source cluster of the data transfer being completed when executing the data transfer on the basis of the data transfer instruction received through said network among clusters, stored into said instruction storage means, and decoded by said instruction decoding means.

4. A data transfer control device as set forth in claim 1, wherein when the data transfer instruction decoded by said instruction decoding means is of the type to transfer the data from another cluster to further another cluster than the present cluster, said transfer control means transfers the data transfer instruction through said network among clusters to the data source cluster or the data destination cluster indicated by the data transfer instruction.

5. A data transfer control device provided in each of a plurality of clusters connected through an area network, for controlling data transfer between local shared memories of each cluster, comprising:

a first instruction storage means for storing a data transfer instruction issued by an arithmetic processing unit, wherein said first instruction storage means and said arithmetic processing unit are contained within the same cluster;

a second instruction storage means for storing a data transfer instruction issued by an arithmetic processing unit, wherein said second instruction storage means and said arithmetic processing unit are contained within different clusters and said data transfer instruction is received through said area network;

an instruction decoding means for reading out the data transfer instruction from said first or second instruction storage means to decode the proper action required by said transfer instruction;

a shared memory access means for reading and writing data to said shared memory, wherein said shared memory access means and said shared memory are contained within the same cluster;

a data transfer means for sending data to said area network and receiving data from said area network; and a transfer control means for controlling said shared memory access means and said data transfer means according to the data transfer instruction decoded by said instruction decoding means, and storing the data transfer instruction issued by another cluster into said second instruction storage means when said data transfer means receives said data transfer instruction from said area network.

6. A data transfer control device as set forth in claim 5, wherein said transfer control means notifies the data transfer instruction source cluster of the data transfer being completed when executing the data transfer on the basis of the data transfer instruction received through said network among clusters, stored into said second instruction storage means, and decoded by said instruction decoding means.

7. A data transfer control device as set forth in claim 5, wherein when the data transfer instruction decoded by said instruction decoding means is of the type to transfer the data from another cluster to further another cluster than the present cluster, said transfer control means transfers the data transfer instruction through said network among clusters to the data source cluster or the data destination cluster indicated by the data transfer instruction.

8. A data transfer control device provided in an information processing system having a plurality of front end clusters and back end clusters connected through an area network and controlling data transfer between shared memories of the clusters by use of said front end clusters, wherein, the data transfer control device provided in said front end cluster comprises:

an instruction storage means for storing a data transfer instruction issued by an arithmetic processing unit, wherein said arithmetic processing unit is provided in any one of said plurality of clusters;

an instruction decoding means for reading out the data transfer instruction from said instruction storage means to decode the proper action required by said transfer instruction;

a shared memory access means for reading and writing data to said shared memory, wherein said shared memory access means and said shared memory are contained within the same cluster;

a data transfer means for sending data to said area network and receiving data from said area network; and a transfer control means for controlling said shared memory access means and said data transfer means according to the data transfer instruction decoded by said instruction decoding means and for transferring the data transfer instruction through said area network to the data source cluster or the data destination cluster indicated by the data transfer instruction when the data transfer instruction is of the type to transfer the data from one cluster to another cluster, wherein said transfer is initiated by a third cluster;

while, the data transfer control device provided in said back end cluster comprises:

an instruction storage means for storing a data transfer instruction issued by an arithmetic processing unit, wherein said arithmetic processing unit is provided in any one of said plurality of clusters;

an instruction decoding means for reading out the data transfer instruction from said instruction storage means to decode the proper action required by said transfer instruction;

a shared memory access means for reading and writing data to said shared memory, wherein said shared memory access means and said shared memory are contained within the same cluster;

a data transfer means for sending data to said area network and receiving data from said area network; and a transfer control means for controlling said shared memory access means and said data transfer means according to the data transfer instruction decoded by said instruction decoding means, and storing the data transfer instruction issued from another cluster into said instruction storage means when said data transfer means receives the data transfer instruction through said area network.

9. A data transfer control device as set forth in claim 8, wherein said transfer control means in said data transfer control device provided in said back end cluster notifies said front end cluster of the data transfer being completed when executing the data transfer on the basis of the data transfer instruction received through said network among clusters, stored into said instruction storage means, and decoded by said instruction decoding means.

10. A data transfer control device provided in an information processing system having a plurality of front end clusters and back end clusters connected through an area network and controlling data transfer between shared memories of the clusters by use of said front end clusters, wherein, the data transfer control device provided in said front end cluster comprises:

an instruction storage means for storing a data transfer instruction issued by an arithmetic processing unit, wherein said arithmetic processing unit is provided in any one of said plurality of clusters;

an instruction decoding means for reading out the data transfer instruction from said instruction storage means to decode the proper action required by said transfer instruction;

a shared memory access means for reading and writing data to said shared memory, wherein said shared memory access means and said shared memory are contained within the same cluster;

a data transfer means for sending data to said area network and receiving data from said area network; and a transfer control means for controlling said shared memory access means and said data transfer means according to the data transfer instruction decoded by said instruction decoding means and for transferring the data transfer instruction through said area network to the data source cluster or the data destination cluster indicated by the data transfer instruction when the data transfer instruction is of the type to transfer the data from one cluster to another cluster, wherein said transfer is initiated by a third cluster;

while, the data transfer control device provided in said back end cluster comprises:

a first instruction storage means for storing a data transfer instruction issued by an arithmetic processing unit, wherein said first instruction storage means and said arithmetic processing unit are contained within the same cluster;

a second instruction storage means for storing a data transfer instruction issued by an arithmetic processing unit, wherein said second instruction storage means and said arithmetic processing unit are contained within different clusters and said data transfer instruction is received through said area network;

an instruction decoding means for reading out the data transfer instruction from said first or second instruction storage means to decode the proper action required by said transfer instruction;

a shared memory access means for reading and writing data to said shared memory, wherein said shared memory access means and said shared memory are contained within the same cluster;

a data transfer means for sending data to said area network and receiving data from said area network; and a transfer control means for controlling said shared memory access means and said data transfer means according to the data transfer instruction decoded by said instruction decoding means, and storing the data transfer instruction issued by another cluster into said second instruction storage means when said data transfer means receives said data transfer instruction from said area network.

11. A data transfer control device as set forth in claim 10, wherein said transfer control means in said data transfer control device provided in said back end cluster notifies said front end cluster of the data transfer being completed when executing the data transfer on the basis of the data transfer instruction received through said network among clusters, stored into said instruction storage means, and decoded by said instruction decoding means.

* * * * *